(12) United States Patent
Hwang (10) Patent No.: US 6,783,685 B2
(45) Date of Patent: Aug. 31, 2004

(54) OIL TREATMENT SYSTEM

(75) Inventor: Yong Y. Hwang, Huron, OH (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 09/841,693

(22) Filed: Apr. 24, 2001

(65) Prior Publication Data

US 2002/0006460 A1 Jan. 17, 2002

Related U.S. Application Data

(63) Continuation-in-part of application No. 09/233,241, filed on Jan. 19, 1999, now abandoned.

(51) Int. Cl.$^7$ .......................... B01D 15/00; B01D 21/26
(52) U.S. Cl. ..................... 210/690; 210/739; 210/781; 210/805
(58) Field of Search ............................. 210/690, 739, 210/781, 805, 806, DIG. 8; 494/7, 901; 426/438

(56) References Cited

U.S. PATENT DOCUMENTS

| | | | |
|---|---|---|---|
| 3,231,390 A | | 1/1966 | Hoover |
| 3,456,798 A | * | 7/1969 | Urdanoff ................... 210/776 |
| 3,599,861 A | * | 8/1971 | DeMartini ................... 494/8 |
| 3,971,508 A | | 7/1976 | Giangiulio |
| 4,519,904 A | | 5/1985 | Helmick |
| 4,913,922 A | * | 4/1990 | Hawkes et al. ............. 426/417 |
| 5,253,567 A | * | 10/1993 | Gunawardena .............. 99/404 |
| 5,318,229 A | | 6/1994 | Brown |

* cited by examiner

Primary Examiner—Matthew O. Savage
(74) Attorney, Agent, or Firm—Pauley Petersen & Erickson (57) ABSTRACT

The invention is directed to an oil treatment apparatus and method for treatment of oil which transports oil to be treated from a source through a first conduit to a treatment station. The treatment station includes a filter system capable of extracting particulate material from the oil and removing the particulate material from the filter system as it is removed from the oil. The treated oil may then be transported for reuse, preferably in a continuous cycle with the source of the oil. A prefiltering system may be used to further enhance maintaining the quality of the oil and/or in efficiently treating the oil while accommodating throughput requirements. The prefiltering system may include a comminuter to reduce the size of larger particles in the oil, a coarse filtering system to remove larger particle, a system to introduce a treatment material to the oil or other systems to facilitate processing. The filtering system is designed to remove particles from the oil having a size of fifteen microns or smaller in the preferred embodiment.

7 Claims, 8 Drawing Sheets

OIL TREATMENT SYSTEM

This application is a continuation-in-part of application Ser. No. 09/233,241 filed on Jan. 19, 1999 now abandoned.

TECHNICAL FIELD

This invention relates generally to frying apparatus for continuous deep vat frying of large quantities of food products in large scale food processing systems, and more particularly to a treatment and filtration system for maintaining oil quality and integrity in conjunction with the fryer.

BACKGROUND OF THE INVENTION

Large scale food processing systems may include large scale frying apparatus which allows a food processor to introduce a battered food product, batter-breaded or otherwise, and/or other coated or uncoated food products into a volume of frying oil for frying in a continuous processing line. Frying oil is generally contained in an elongated reservoir, and it is heated by suitable heaters, such as heating tubes, thermal fluid heat exchangers or direct fired heating as examples. One significant problem associated with such frying apparatus is the large volume of frying oil used and required for immersing the battered and/or breaded food products in the oil bath. These large volumes of oil are then exposed to the food itself and the food or coating particles dislodged from the food as it is conveyed through the fryer on a conveyor system. Additionally, other materials may be released from the food during the frying process which include starch grains, maillard reactants, caramelization reactants, fats and water and other materials. As these food particles, fats, starch grains, maillard reactants, caramelized reactants and water and other extraneous materials remain in the oil during the frying process, degradation of the oil quality occurs. Degradation of the physical and chemical properties of the frying oil can result in adverse tastes, colors, odors or the like in the food product being cooked. Also, the organoleptic qualities of the fried food products begin to degrade as the oil quality degrades, due to the maillard and caramelization reactions created as the food passes through the fryer, or from food particles dislodged, leached or otherwise removed from the food during cooking.

The processor faced with these concerns resorts to disposal of the volume of oil after relatively short frying cycles, and the reintroduction of another fresh volume of oil. It should be recognized that disposal of a large volume of oil from a continuous frying apparatus requires suitable facilities to properly dispose of the spent oil, and the reintroduction of oil into the frying apparatus to continue the cooking process. The changing of spent oil in the frying system necessarily reduces throughput of the cooking process significantly, and the volumes and associated costs of the cooking oil itself can become excessive. Extending the life of the frying oil would substantially reduce the volumes and cost of the cooking oil itself as well as time spent handling used oil and refreshing the frying system, thereby minimizing down time in the frying process.

In the frying process, cooking oil will eventually degrade, imparting unwanted tastes, odors and colors to the oil and food products fried therein, caused in part by the creation of free fatty acids in the cooking oil created when food particles remain in the oil. As the percentage of free fatty acids in the cooking oil increases, these unwanted characteristics also increase, along with the creation of smoke or possible fire, again causing significant problems or serious hazards.

It would therefore be extremely useful to prolong the usable life of cooking oil by reducing the formation of free fatty acids generated in the cooking process. Filtering the oil to remove food particles or other debris from the oil has been attempted, and attempts have also been made to treat the spent oil to reduce the percentage of free fatty acids therein in a separate treatment process once the oil is removed from the fryer. Although intended to provide some of the desired benefits, such attempts have not been fully successful. This results in part from inadequate removal of fine particles and the removal of large quantities of retained oil in any particulates removed from the oil.

SUMMARY OF THE INVENTION

Based upon the foregoing, it is an object of the invention to provide a frying system and process which greatly enhances oil quality and integrity during a frying cycle, and extends the useful life of the cooking oil to reduce the volumes of spent oil which must be discarded or otherwise disposed of.

The invention is therefore directed to an oil treatment apparatus and method for treatment of oil which comprises a source of oil to be treated coupled to a first conduit, and transporting oil from the source to a treatment station. The treatment station comprises a filter system capable of extracting particulate material from the oil and removing the particulate material from the filter system as it is removed from the oil. The treated oil may then be pumped for use in a continuous cycle with the source of the oil. Alternatively, the treatment system comprises a source of cooking oil communicating with the treatment station, wherein the treatment station receives cooking oil and includes a filter system which extracts particulates down to a size of approximately one micron. The cooking oil is preferably continuously supplied to the filter system and returned for use after the particulate material has been extracted.

These and other objects and advantages of the invention will become apparent upon a further reading of the detailed description of the invention in conjunction with the drawings.

DETAILED DESCRIPTION OF THE INVENTION

In large scale food processing operations, as well as in corner fast food restaurant environments or the like, filtration of cooking oil has been recognized as being beneficial for a variety of reasons. Some of the benefits gained include reduced smoking of the hot oil, reduced foaming and toxicity, as well as reduction of oil pick up in the fried food product. Additionally, filtration of oil in a frying operation may have particular aesthetic benefits including improved product appearance, reduced batter/breading blow off, as well as improved taste in the fried product. Of particular significance in a large scale industrial food processing operation of meats and poultry, snack foods and other prepared food products is found in the longer shelf life or vitality of the cooking oil, resulting in less oil waste and significantly improved product yield.

In a typical large scale industrial food processing environment, the large volumes of hot oil needed in the frying process present unique and significant obstacles to properly cleaning or conditioning the cooking oil. Of particular importance in this environment, the present invention is directed to the removal of particulate matter from the hot oil on a continuous basis to extend the useful life of the cooking oil as well as to increase the quality and appearance of the food products being processed. Distinct from other environments, the cooking oil in a large scale processing environment can quickly become contaminated with moisture, carbonized food particles, metal ions as well as other oil soluble compounds such as free fatty acids or other polar materials. Free fatty acids are a common way to measure oil quality, and as such acids increase, the quality of the oil is reduced and food quality and appearance are degraded. Contaminants as well as chemical breakdown byproducts in the oil can cause excessive smoking, bad smell, as well as imparting bad appearance or taste to the fried food product.

Also of significance in the large scale food processing environment, is reducing the amount of cooking oil retained within removed particulate, which together with improving oil quality and life, significantly reduces operating costs. Other considerations are meeting regulatory agency requirements, such as USDA requirements, imposed upon industrial food processors. It should further be recognized that in industrial food processing environments, handling of hot cooking oil may impose significant obstacles, including safety concerns in movement of the hot oil, and the production of heat within the processing environment from the handling of the hot cooking oil.

The present invention is therefore directed at a food processing system including a fryer in which a large volume of cooking oil is disposed for frying of food products in a continuous in-line operation. A conditioning and filtering assembly may be integrated in conjunction with the frying apparatus, or may be provided as a stand-alone unit which can be selectively supplied with cooking oil for treatment from one or more frying apparatus. Turning to the figures, an understanding of the invention may be gained in conjunction with the following description.

Figure 1:
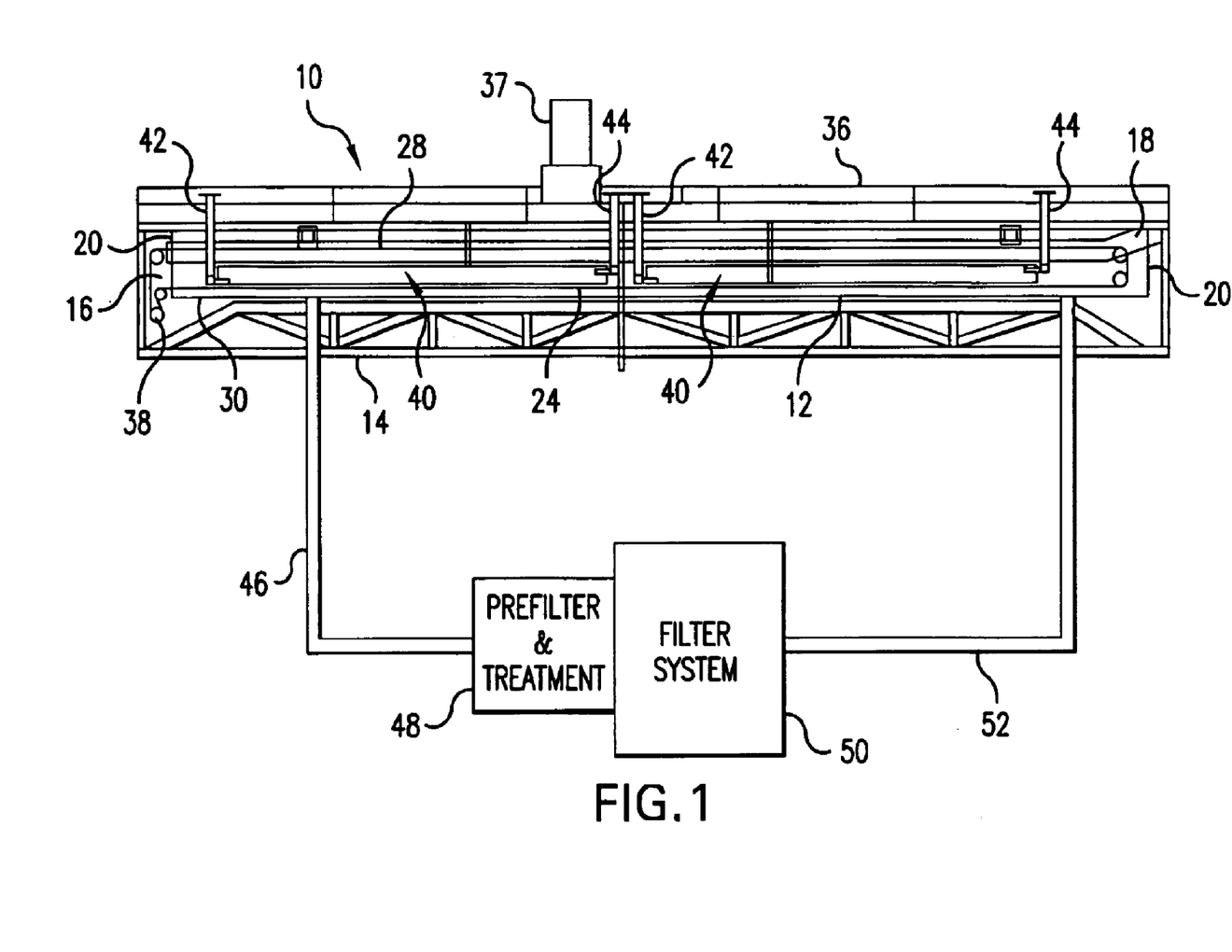
FIG. 1 is a generally schematic representation of an oil treatment apparatus according to the invention.

Turning now to FIG. 1, a preferred embodiment of a frying system including an oil treatment apparatus is shown generally as 10, and includes a fryer housing 12 supported by a frame 14 as an example. To fry large volumes of food products, the housing 12 generally is formed as an elongated reservoir which defines a cooking channel 16 bounded by front and rear walls 20, sidewalls 18 and bottom wall 30. The reservoir defining cooking channel 16 holds a volume of cooking oil. A conveying system 28 may be positioned within the cooking channel 16, to carry food products through channel 16 while immersed within the cooking oil. The speed of the conveying system 28 is generally variable to allow various configurations of food products to be retained within the cooking oil for a predetermined dwell time. Included in the frying apparatus is a heat exchanging system for heating of the cooking oil within the reservoir of housing 12. Heating systems may include direct fired, indirect fired or thermal fluid heating systems or any other suitable heat source for uniform heating of the cooking oil within the system. In the example shown, a heat exchanger 40 is positioned at the lower part of the reservoir, such as a thermal fluid heat exchanger having inputs and outputs 42 and 44 respectively. Any suitable heating mechanism for the cooking oil such as in this example is contemplated in the invention. It is contemplated in the invention that any suitable frying system including the elements of a reservoir for the cooking oil, a mechanism for heating the oil in the reservoir, a mechanism for introducing and removing food products from the reservoir and a mechanism for transporting the cooking oil to and from the oil treatment apparatus may be used.

In general, food products to be processed by the frying system 10 may be breaded or otherwise coated food products such as meat and poultry products, vegetable products or the like. Alternatively, unbreaded or uncoated foods such as snack or baked products may be processed through the system 10, which may include fillings wrapped with dough or the like, cereals and other products. Like breaded or coated food products, such foods have a tendency to release particles into the cooking oil as they pass through the cooking channel 16. In many cases, the coating material used with a food product to be processed may include flour particles as at least a component thereof, or may be comprised of exclusively flour material. Other food particles released by the food products during processing may also be similarly sized to flour particles, being very small to the point of individual particles not being visible to the naked eye. Milled flour generally is comprised of particles between one and one hundred microns with many at the smaller end of this range. It is desirable to efficiently remove any extraneous food particles or debris from the cooking oil as previously described. To facilitate removal of such particles, the lower run of the conveyor system 28 forms a sediment conveyor 24 traveling along a bottom portion of the cooking channel 16 to facilitate removal of any particles or sediments released from food products which have sunk to the bottom of the cooking oil within the reservoir. The sediment conveyor run 24 may move any larger particles which have fallen to the bottom of the cooking oil towards a discharge auger 38 positioned at the discharge end of this sediment conveyor run 24. Although potentially facilitating removal of larger particles which are heavy enough to fall to the bottom of the tank of cooking oil, many smaller particles, including flour particles, may not be removed. Such particles tend to remain suspended within the cooking oil, and continue to be heated to the point of scorching. If left to remain within the cooking oil, these particles will quickly degrade the oil quality and increase the production of free fatty acids with the consequential deterioration of the oil quality for frying. The invention therefore includes in coupled relationship with the reservoir of cooking oil, a filtering and treating system which will preferably efficiently and effectively remove particles from the cooking oil on a continuous basis. The preferred embodiment also will remove particulate, including flour or like sized particles having a size of fifteen microns or less and preferably down to a size of less than one micron. Although the sediment conveyor 24 may still be used to facilitate removal of larger particles and sediments, it should be understood that it is not a critical aspect of the invention. Similarly, the particular frying apparatus may be of any desired configuration, with examples of large volume fryers being shown in U.S. Pat. Nos. 4,913,042, 5,074,199 and 5,253,567, each owned by the assignee of the present invention. Other systems may also be suitable and are contemplated within the invention even if they do not comprise all of the features of the system as noted in FIG. 1.

In order to filter and treat the entire volume of cooking oil within the fryer reservoir, the invention is designed to selectively transport oil from the reservoir through a conduit or piping 46 to a treatment station comprising prefilter and/or treatment system 48 and a primary filter system 50. It should be recognized that the oil to be treated is preferably supplied directly from the fryer to the treatment system according to the invention, and will therefore be very hot. The treatment system is therefore preferably designed to handle high temperature oil, which typically may be heated to temperatures of 400 degrees F. or the like. The oil may be transported to the treatment system 48 by any suitable mechanism, such as being gravity fed or positively pumped, After being filtered and/or treated, the hot cooking oil is transported or pumped back to the reservoir via piping 52. The filtering and treating system generally comprised of components 48 and 50 may be configured to work in conjunction with a single frying apparatus, or a plurality of such apparatus may be coupled to the system if desired. Thus, the system may be configured to be situated on an external frame separate from the frying apparatus or may be combined therewith if desired. It is preferred that oil be transported to the treatment station for continuous processing thereof, but it is also possible to use the treatment station in a discontinuous or discrete fashion for a volume of oil.

Figure 2:
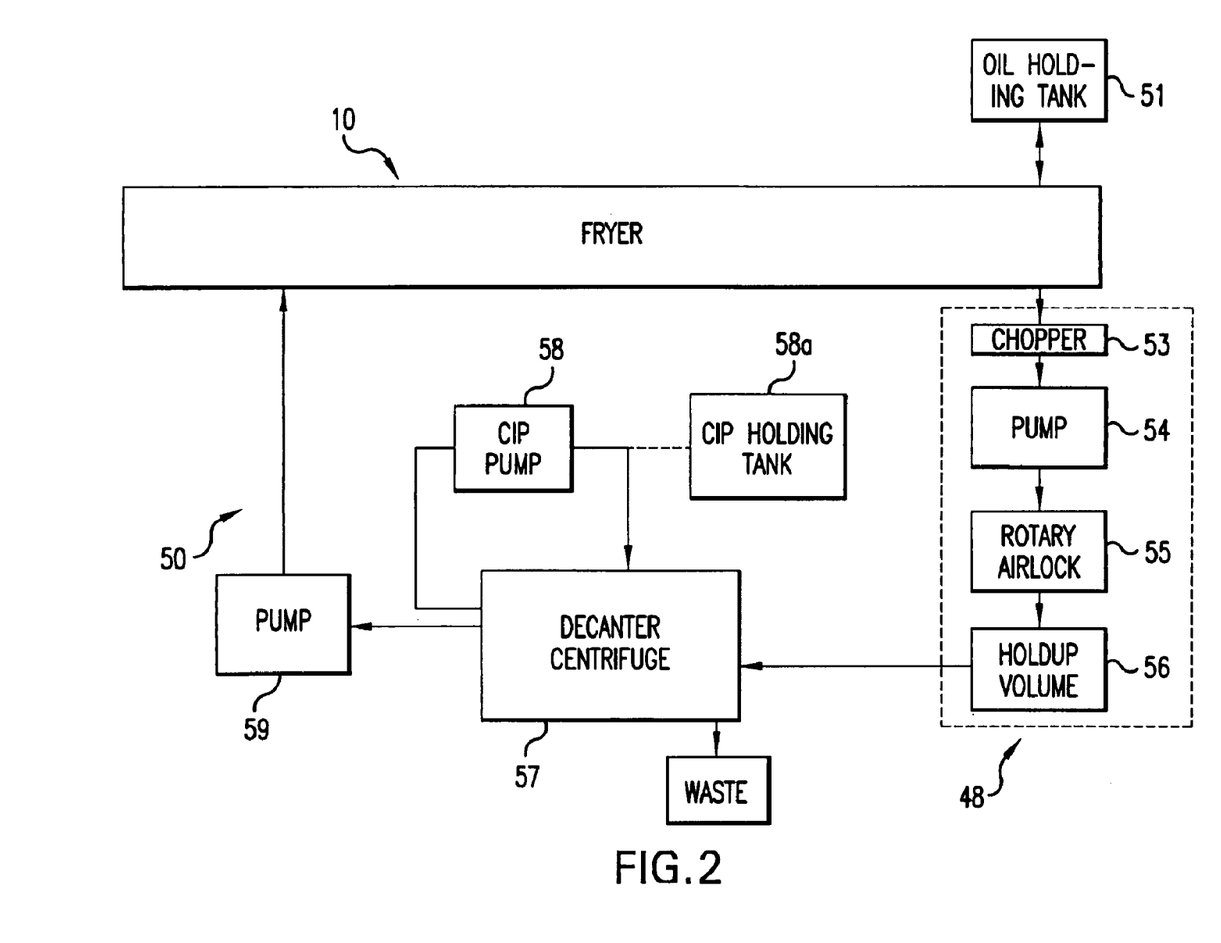
FIG. 2 is a generally schematic representation of a further embodiment of an oil treatment apparatus according to the invention.

A preferred embodiment of the invention includes a variety of components, some of which are optional for particular environments or conditions as an example. FIG. 2 shows a preferred system to include a fryer 10, having an oil holding tank 51 coupled to selectively supply fresh cooking oil to the fryer 10 when desired. During a processing cycle, the cooking oil is selectively pumped via a pump 54 from the fryer 10 and supplied for treatment and/or filtering. An optional comminuter 53, such as a chopper or other suitable apparatus may be used to comminute or break down larger particles to smaller sizes for more efficient removal. Alternatively, a coarse filtering stage to remove larger particles from the cooking oil could be used in place of a mechanism to break down the particles if desired. It is also may be a consideration to prevent any other materials which cannot be effectively handled by the subsequent filtering stage, from passing through the prefilter and/or treatment system. If a metal object such as a bolt or nut is supplied to the filtering system, the possibility of damage to the equipment would make it desirable to prevent such an occurrence. The prefiltering/treatment stage may therefore also include a metal detector or other suitable mechanism to halt operation of the system to prevent such damage. For treatment of the cooking oil, a feed mechanism 55, such as a rotary airlock, may be used to feed into the cooking oil a predetermined treatment material, such as a diatomaceous earth, fuller's earth, activated carbon or other material designed to treat the oil in a predetermined manner. In this regard, there may also be an optional holdup tank or volume 56 in which a volume of oil having a treating material added thereto may be held for a short time to allow the treatment materials to work. Preferable treatment materials may include agents to remove free fatty acids, colored substances and/or flavored substances in the cooking oil. The cooking oil then proceeds to the filtering equipment 50, which may include a main filter apparatus 57 such as a centrifuge filter as will be described with reference to the preferred embodiment. The preferred filter apparatus 57 will also include an optional Clean-In-Place (CIP) system including a CIP pump 58, which selectively supplies cleaning or rinsing fluids to the CIP system. A CIP fluid holding tank 58a may be used for selectively storing CIP cleaning fluids, thereby conserving resources and reducing operation costs. A pump 59 may then be used to pump cooking oil which has been treated and/or filtered back to the fryer 10.

Figure 3:
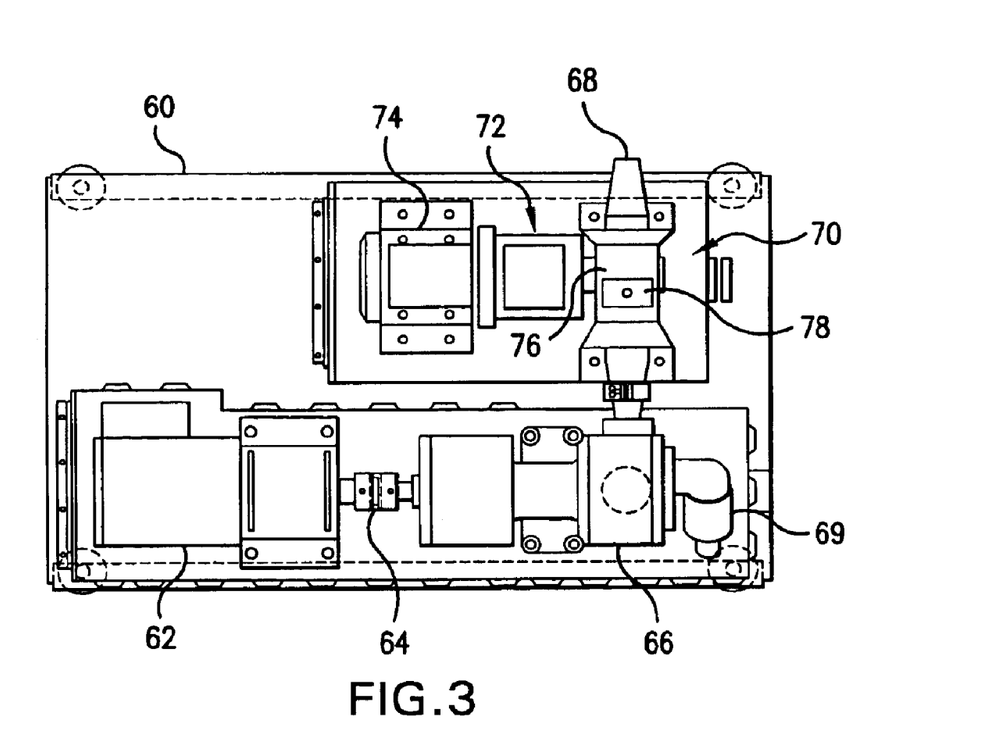
FIG. 3 is a top elevational view of prefiltration/treatment system and infeed pump assembly according to the preferred embodiment.
Figure 4:
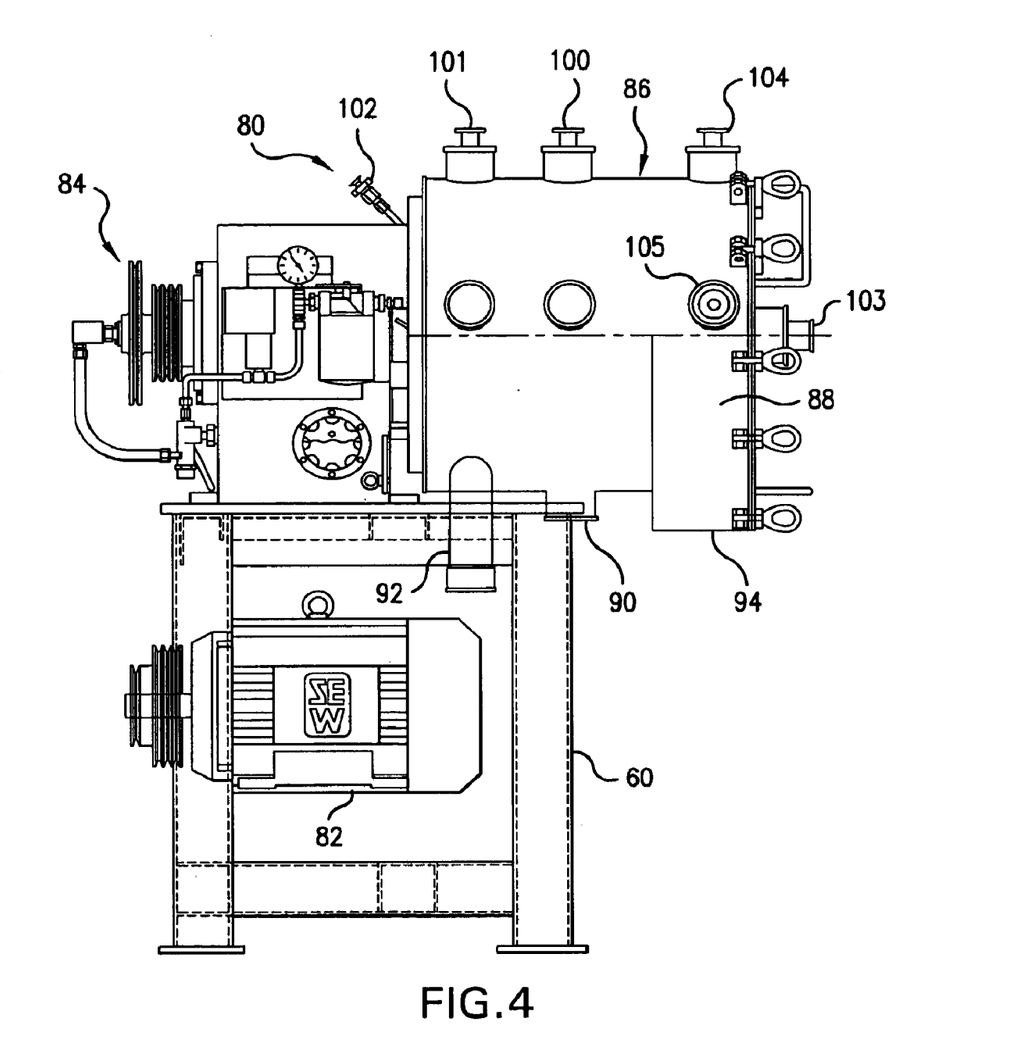
FIG. 4 is an end elevational view of an embodiment of a filtration system according to the invention.
Figure 5:
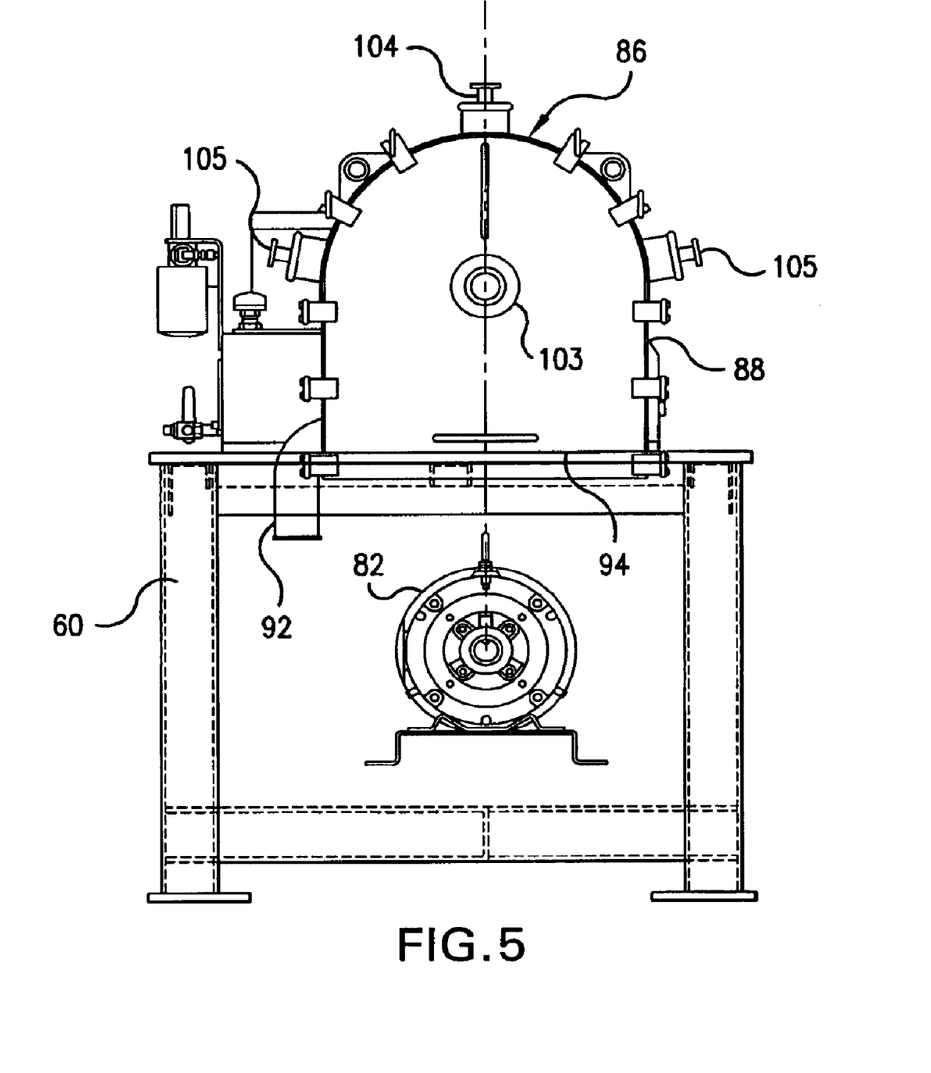
FIG. 5 is an elevational view of the system as shown in FIG. 4.

The filtering and treating system according to a preferred embodiment of the invention is shown in FIGS. 3–5, wherein a separate supporting frame 60 is used to support various equipment in relationship to the frying apparatus as described with reference to FIG. 1. Although shown as a separate support frame, the supporting structure for the system may also be integrated in with a frying system if desired. Using a separate support frame, it is possible to consider a filtration and treating system according to the invention which is located relative to a plurality of frying systems to allow the quantity of cooking oil from each to be effectively filtered and treated in the desired manner. Thus, although a preferred embodiment of the invention as will be described may allow certain volumes of cooking oil to be treated and filtered, other capacities may be accommodated as required for a particular situation or environment.

Mounted on the supporting structure 60 may be a drive motor 62 coupled through an output drive coupling 64 operating an infeed pump 66 having a predetermined capacity, and preferably being variable to accommodate different processing environments, applications or food products. As it is desirable to adjust filtration and treatment of the cooking oil to accommodate desired throughput while acquiring the benefits of maintaining the oil quality using the system, the flow rates of cooking oil from the frying apparatus to the system may preferably be adjusted accordingly. Other aspects of the system may also be adjusted, such as the size of particle removed by the filtration system as will be discussed further. As an example, large scale frying systems may use 800 to 900 gallons of cooking oil, and flow rates of this cooking oil through the filtration and treatment system is preferably preformed continuously during a processing cycle. Once the cooking oil is up to temperature within the fryer apparatus, food products may be introduced for processing, and an amount of oil continuously cycled through the filtration and treatment such that the entire volume of the oil within the fryer is filtered and treated in the desired manner. Flow rates of between 10 and 40 gallons per minute are contemplated, or for a fryer of this capacity, it has been found that a flow rate of approximately 25 gallons per minute may be acceptable. As an example of a preferred embodiment, it has been found that pumping a volume of cooking oil equal to approximately twice the volume of the fryer with which the system is used per hour gives excellent results. Again, variations in the food products, coating materials, or other aspects of the processing environment may dictate other flow rates as being desirable.

It is also desirable to have a treatment stage which has an opening to handle large particulate or larger volumes of suspended particulate without plugging. Infeed oil from the fryer apparatus is directed to treatment stage via conduit 68, and directed to a pump generally indicated at 66. While a treatment stage to break up large particles has been found to be useful for some applications, it is an option and not a requirement in the preferred embodiment, and may not be necessary for many applications. The treatment stage 70 preferably performs at least the function of comminuting any larger particles or clumps of particles within the oil stream being processed. To efficiently break up any larger particles, a torque limiter 72 may be provided to limit the amount of torque potentially applied to the treatment stage 70 should this system be clogged with large particles or the like. Treatment stage 70 includes a motor 74 which drives an assembly of interleaved bars through which the oil is made to flow at 76. Any larger particles of material are efficiently broken up into small particles of the size which will be effectively removed by the subsequent filtration system to be described. Typically with any filtering system, efficiency of removing particles over a wide variety of sizes is somewhat limited, and filtering is optimized if most particles are within a predetermined size range. The treatment stage 70 acts to break up larger particles to allow more efficient separation of suspended particles from the cooking oil in this manner. The treatment stage 70 also has the benefit of protecting the treatment stage 70 from any debris which cannot be broken up, such that the possibility of a nut or other metal object within the cooking oil would not cause damage to the system, but instead would shut down the motor 74 if excessive torque is experienced in the limiter 72. Alternatively, other possible arrangements for breaking up larger particles could include the use of a grinder pump, gear pump, progressive gravity pump or a sine pump as examples. Further, other arrangements for detecting objects which will not pass through the system and could cause damage, could be provided, and a control system used to selectively cause shutdown of the system upon detecting any such objects. For example, a metal detector could be used to identify if any metallic objects are within the oil, or other suitable mechanisms used. The output from pump 66 at 69 then supplies cooking oil in to the filtering system, preferably in a continuous stream. Although it is possible to use a pump which causes intermittent flow of cooking oil from the fryer, possible settling of suspended particles may occur, which may not be preferred for a particular application. As another alternative, a prefilter assembly could be provided to selectively remove larger particles from the cooking oil instead of breaking up such particles. A belt filter or other suitable equipment may be used for such a purpose if desired, although it is preferred that if such a system is used, it not inhibit proper flow of the cooking oil to the main filtration system.

As an alternative embodiment of the invention, it is also possible to introduce a treating material to the cooking oil as it is passed through the pump assembly 66. In such an embodiment, the access opening 78 associated with the treatment stage 70 at the location of the bars disposed within the stream of cooking oil at 76, provides access for introducing a treating material to the cooking oil stream. A suitable feed mechanism could be coupled to access opening 78 or an opening in another location to introduce a predetermined amount of treating material to the cooking oil stream prior to filtration of the oil as a subsequent operation. A suitable treating material may include a diatomaceous earth material, fuller's earth material, activated carbon material or other suitable treatment agents. It is known that treatment of cooking oil using diatomaceous earth can remove free fatty acids and other byproducts of the food products and released particles to which the oil is exposed in the frying process. Treating the cooking oil continuously during operation will avoid the need to remove the volume of used cooking oil from the fryer on a regular basis and thereafter introducing a fresh volume of cooking oil while treating the spent cooking could be performed at a separate location. It should be evident that such an approach is quite efficient, and further does not require transporting hot oil and separately introducing treating materials, which create significant safety hazards. In this invention, these deficiencies are removed, and a treating material may be easily introduced to the cooking oil stream prior to filtration. By introducing material within the stream at the location of torque limiter 72, any treating material introduced to the cooking oil stream is effectively mixed with the stream to more efficiently remove unwanted chemical byproducts and compounds. The cooking oil stream is thereby effectively treated in a continuous process to further enhance extending oil quality and life. The introduced diatomaceous material or other treatment material is also effectively removed from the cooking oil in the subsequent filtration step, as the particle sizes used in such material will preferably be of similar sizes to the food particles in the cooking oil.

Turning now to FIGS. 4–5, there may also be mounted upon support 60 or on a separate supporting structure a filtration system generally designated 80 which is supplied with cooking oil from the pretreatment and infeed pump assembly described with reference to FIG. 3. A drive motor 82 is coupled via drive belts or the like (not shown) to a drive pulley 84 associated with the filtration system 80. In the preferred embodiments, the filtration system 80 comprises a solid bowl decanter centrifuge, which may be supplied with cooking oil from the frying system for continuous removal of solids suspended within the cooking oil stream. The centrifuge, generally indicated at 86 includes a housing 88 which supports therein a bowl decanter comprised of one or more sections, which can include cylindrical and/or conical sections. The cooking oil is introduced into the housing 88 via an inlet pipe 90 to the interior of the centrifuge, and drive motor 82 operates drive pulleys 84 to cause a constant differential speed between a worm and bowl coupled to the drive mounted interior to housing 88 and a scroll conveyor also driven by motor 82 and another of the drive pulleys 84. A screen is mounted about the bowl and variable sized openings are provided therein through which oil is forced while particulate are separated. A suitable centrifuge type equipment which may be modified to operate in the filtration system 80 according to the invention is produced by TEMA Systems, Inc., such as Model TS210 as an example. In general, this type of centrifuge equipment would include a cylindrical settling section and a tapered section in the bowl decanter, with the inside of the bowl provided with a scroll conveyor. The scroll conveyor is driven at a differential speed to that of the bowl, which can be performed by a differential speed drive or other suitable configuration. The liquid phase of the cooking oil stream will migrate to the large end of the bowl to be removed through the ports, with the solids deposited on the bowl wall transported to the small end of the bowl by the centrifuge action. The separation of oil from particles entrained therein will take place in the cylindrical part of the bowl predominantly, with particles then further de-oiled in the conical part of the bowl. The size of particulates removed by the system 80 is preferably adjustable to maximize efficiency of the filtration depending on the expected sizes of particulates, and along with throughput requirements. Using a system as shown in the FIGS., the size of particle extracted can be reduced by increasing the rotational speed of the centrifuge, by lowering the differential speed of the outer bowl, or by lowering the pump feed rate as an example, and vice versa. Other filtration systems may also be suitable in place of centrifuge 80, with the characteristics of the filtering system designed to remove particles at least as small as 25 microns, and preferably particles as small as one micron. Using the centrifuge 86, filtered oil would be discharged through an outlet port 92, while particles removed from the oil would be substantially de-oiled and removed from the system via an outlet chute 94. As the particles removed from the cooking oil stream have been substantially de-oiled before they are discharged via chute 94, the particles are generally much cooler and substantially easier to handle, providing significant benefits. The filtration system is also preferably designed to remove as much oil as possible from the filter particles, to limit loss of oil in the removed sediment and maximize efficiency. It is also possible to enhance treatment of the cooking oil in the system to introduce an inert gas into the housing 88 during operation, so as to reduce or prevent any oxidation of the cooking oil while being treated. Such a gas could be selectively introduced via a port, such as a CIP port to be discussed hereafter, or in another suitable manner. A convenient gas may be carbon dioxide or nitrogen, which many times is readily available in a food processing environment.

As the continuous stream of cooking oil is to be processed through the treatment and filtration systems according to the invention in the environment of food processing, it is also a critical aspect of the invention that all components of the system be readily cleanable to the criteria as established by various regulatory agencies. For this reason, the filtration system 86 is provided with a clean-in-place (CIP) system so as to periodically perform thorough cleaning cycles of both the frying apparatus as well as treatment and filtration systems. Thus, the fryer apparatus will typically include the ability to introduce a caustic cleaning agent during a cleaning cycle to the fryer housing which may be pumped through the treatment and filtering system as would cooking oil in a food processing cycle. In this manner, much of the piping through which the cooking oil travels is cleaned efficiently, and the cleaning cycle will also introduce the cleaning agents to the treatment and infeed pump assemblies and cycle through the filtration system. In addition, other surfaces of the filtration system 86 are cleaned via cleaning ports 100–105 which are situated at various predetermined locations about the housing 88. A source of cleaning fluid may be coupled to each one of these ports 100–105 to introduce cleaning or rinsing fluids into housing 88 for thorough cleaning of all interior surfaces which may be in contact with the cooking oil and subsequently food products.

A CIP fluid holding tank as described with reference to FIG. 2 may also allow cleaning solutions to be conserved and potentially reused in the system of the invention. During a cleaning cycle, typically a caustic cleaning agent is mixed with an amount of water. After use, the caustic cleaning solution is generally discarded, as it will carry with it the dislodged food or other materials removed from surfaces in the system. In the next cleaning cycle, a new batch of cleaning solution will be mixed for use. The caustic cleaning agents are very expensive, and this activity represents a significant cost to the food processor. In the present invention, by running the cleaning solution through the treatment station, and particularly the filter system 86, the solution may be cleaned sufficiently of extraneous materials to be reused in a subsequent cleaning cycle. After passing through the filter system 86, the cleaning solution may be transported to the holding tank for temporary storage between cleaning cycles. When the next cleaning cycle is to be initiated, the strength of the caustic chemicals in the cleaning solution may be monitored, and adjusted if necessary, and the solution transported back to the fryer or treatment station for use.

In the preferred embodiment, the CIP system may be operated as follows for efficient cleaning of all interior surfaces of the filtration system 80. Initially, the ports 100–103 may be supplied with cleaning solutions to dislodge and clean interior surfaces at the top and back of housing 80, and thereafter, the ports 104 and 105 may be supplied with cleaning solution to not only clean surfaces adjacent to these ports, but also to urge any material dislodged by the cleaning action from ports 100–103 to be removed from housing 80. The preferred CIP system utilizes high pressure spray nozzles or balls mounted internally to housing 80 and coupled to ports 100–105 respectively. The spray nozzles will disperse cleaning fluids under high pressure against the interior surfaces to effectively clean such surfaces, and the particular configuration shown or its operation may be modified for alternative filtration systems or other applications as desired. The port 103 may also serve both as a CIP port as well as an input port for infeed oil during processing cycles, with the cleaning head selectively coupled into the port for a cleaning cycle.

Figure 6:
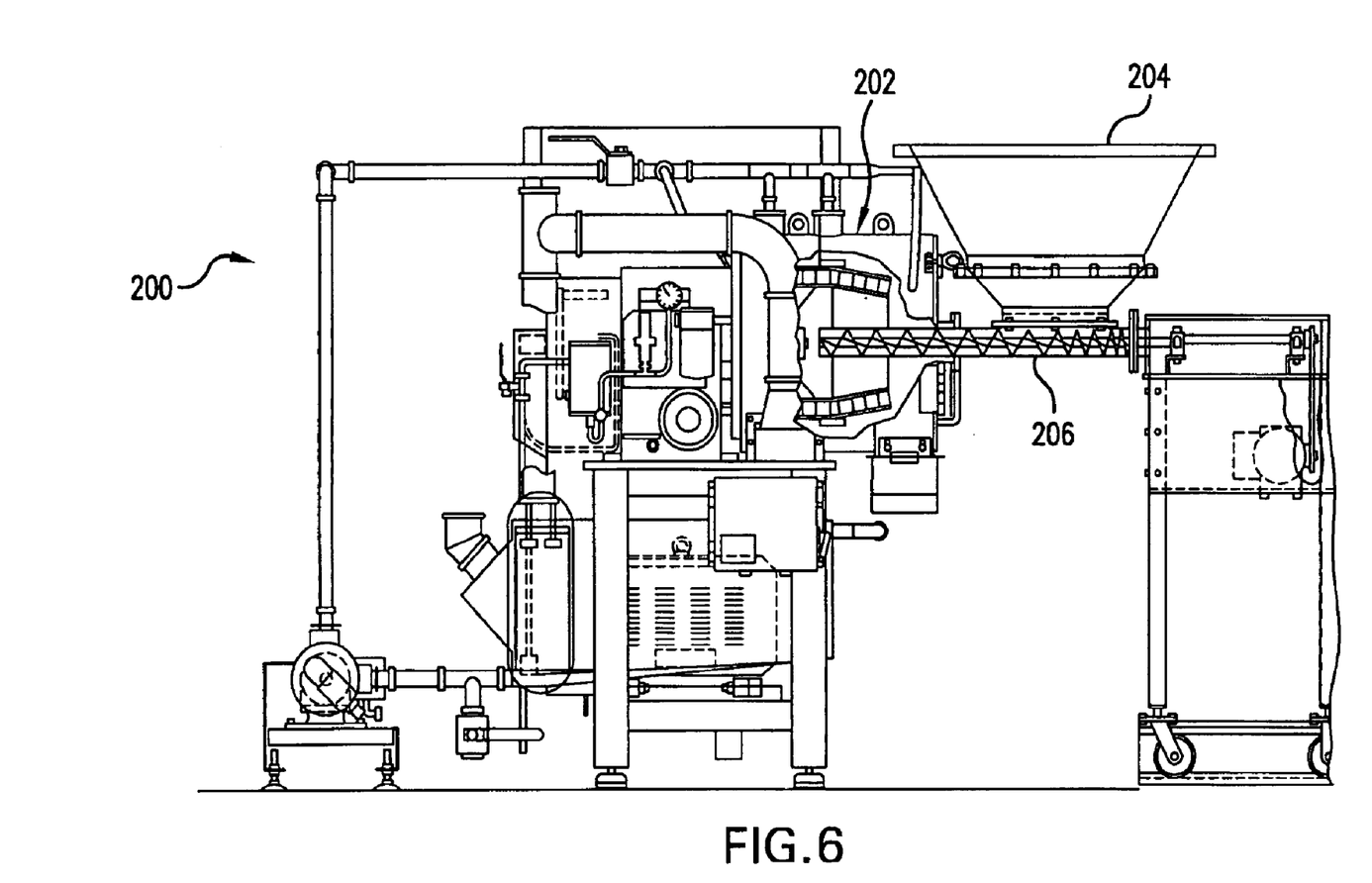
FIG. 6 is an elevational view of an embodiment of an oil recovery system according to the invention.

Turning to FIG. 6, an alternate system according to the invention is shown generally at 200, relating to an oil recovery apparatus. The apparatus 200 comprises a filtering or treatment system 202, which may be generally similar to the system as described previously. In this embodiment, the system 200 is not connected directly to a frying system, wherein oil is cycled from the frying system to the filtering system and then returned to the fryer for use. In this embodiment, the system 200 is off line from a frying or other system wherein oil is retained with another material and is desired to be recovered from the material. Thus, the treatment system 202 is coupled to a feed hopper 204 in which a material from which oil is to be recovered is selectively input. The feed hopper 204 is in turn coupled to a conveying system 206, such as a screw conveyor or other suitable conveying system, to deliver material introduced into the hopper 204 to the treatment system 202 at a predetermined rate. In this manner, material having oil retained therein is selectively supplied to the feed hopper, and the oil retained with the material is recovered by the system 200. Operation of the system 202 may be similar to that of the embodiments previously described.

Figure 7:
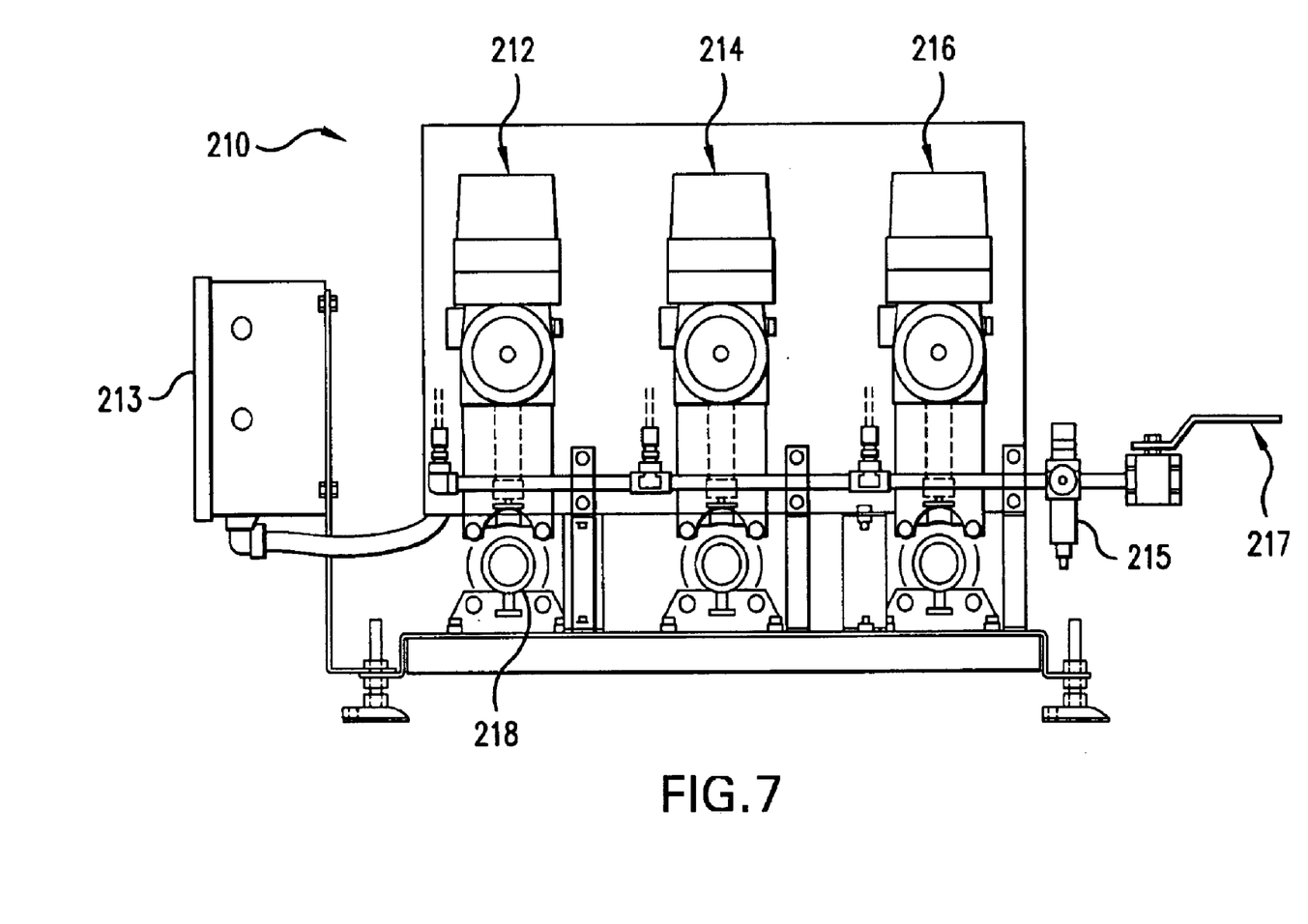
FIG. 7 is a elevational view of a valving system for use in the system of the invention.
Figure 8:
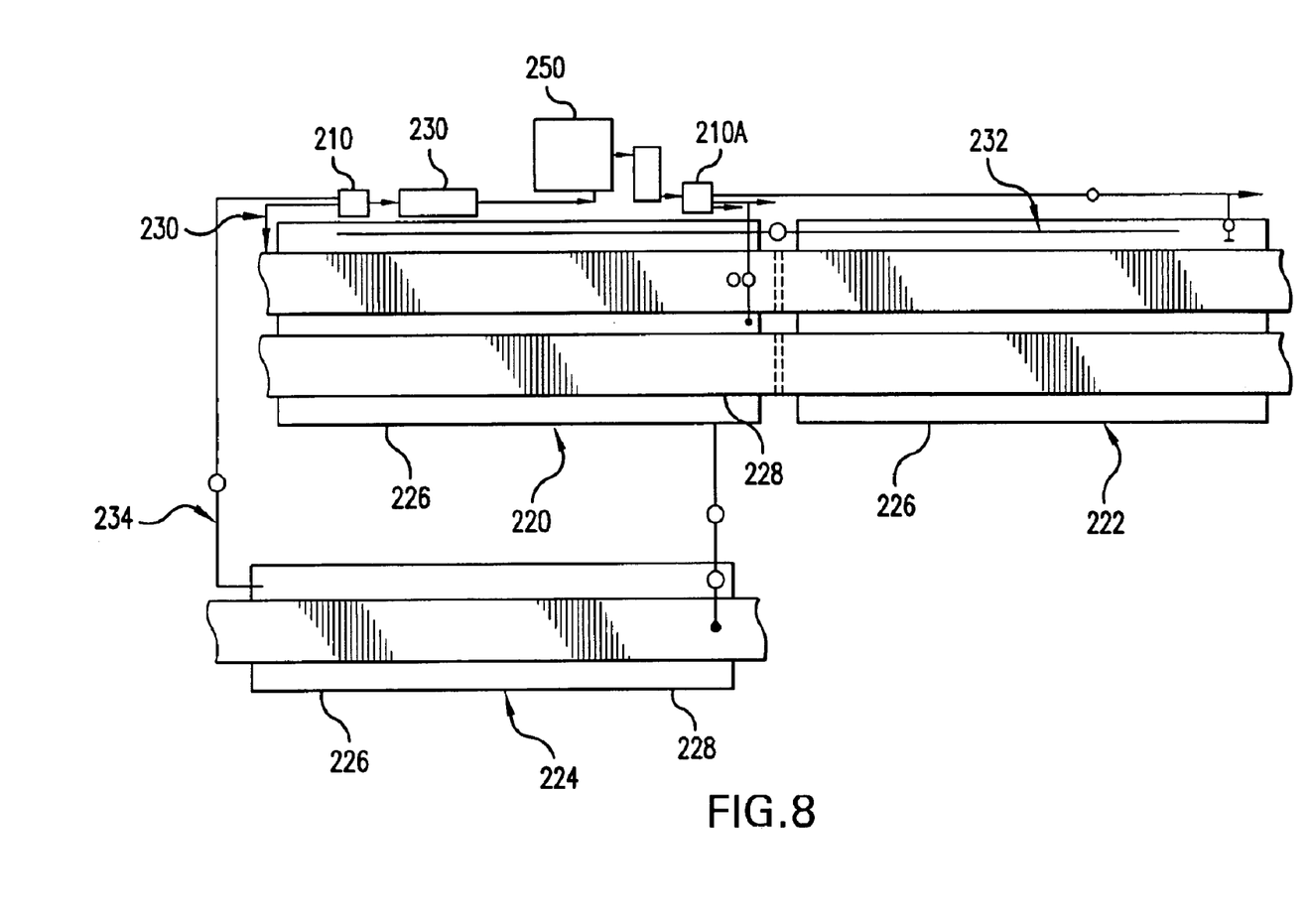
FIG. 8 is a schematic representation of the system according to the invention for use with a plurality of food frying systems.

Turning to FIGS. 7 and 8, an alternate system according to the invention is configured to filter cooking oil from a plurality of food frying systems. In many large scale food processing environments, the processor may have a plurality of frying systems in place to handle the volumes or different food products to be processed. Thus, it is an aspect of the invention to provide an oil treatment system, which can be used in conjunction with a plurality of frying systems. As seen in FIG. 7, a valving system generally indicated at 210 is coupled to different frying systems to allow oil from each system to be selectively applied to the treatment system according to the invention. The valving system 210 comprises in the embodiment shown, three valves 212, 214 and 216, each having an inlet opening 218 to which is coupled a supply line (not shown) from an individual fryer apparatus to supply oil from the frying system to the valving system 210. The valves 212, 214 and 216 may be solenoid controlled or of other suitable configuration as desired. The valving system is then controlled to selectively supply oil from one of the frying systems to a treatment system according to the invention. The valving system 210 may comprise a control system 213, a regulator 215 and ball valve 217, to control operation of the system 210.

The valving system 210 as shown in the embodiment of FIG. 7, having three valves 212, 214 and 216, may thus be used to treat oil from at least three distinct frying systems, such as in a configuration as shown in FIG. 8. In FIG. 8, the frying systems 220, 222 and 224 comprise oil reservoirs 226 through which a conveyor system 228 runs. Food products to be fried are selectively positioned on the conveyors 228 and travel through heated cooking oil in reservoirs 226 for processing. Supply lines 230, 232 and 234 respectively couple each of the systems 220, 222, and 224 to a first valving system 210 positioned prior to an oil treatment system 250 according to the invention. The output of the valving system selectively supplies oil from one of the valves 212, 214 and 216 to an outlet conduit, which is coupled to an in-feed pump 230. The pump 230 supplies oil to a treatment system 250 according to the invention, and the treated or filtered oil from system 250 is output to a second valving system 210A for redistribution to one of the frying system 220, 222 or 224 or to more than one of these. The ability to selectively supply oil from multiple systems to a single treatment system 250 provides significant advantages and avoids the use of multiple treatment systems. Further, the processor can easily control through use of the valving system 210 the distribution of oil in each of the frying systems. As it may be desirable to commingle oil from the separate systems 220, 222 and 224, the valving system 210 can be computer controlled or the like to allow desired distribution of oil from and to the individual fryers. It should be recognized that the system could be tailored to any particular setup, with more or less valves provided as needed for handling oil from multiple systems. Also, further valves may be provided in the supply lines, such as drain valves and/or check valves as needed or desired to supply and distribute oil through the system in the desired manner or to drain the system.

The oil treatment and recovery systems according to the invention provide an efficient and effective arrangement which allows adaptability for various particular requirements as desired. Although preferred embodiments of the present invention have been described herein, various modifications or changes are contemplated within the scope of the invention. The invention is therefore not restricted to that described above and shown in the drawings but may be modified within the scope of the appended claims.

What is claimed is:

1. A method of treating oil comprising the steps of:
   a) transporting a source of oil containing particulate materials to a treatment station, said treatment station including at least a filter system, said filter system being capable of continuously extracting said particulate materials from the oil and removing said extracted particulate materials from the filter system,
   b) supplying said oil at a predetermined flow rate to said filter system and extracting said particulate materials of at least a predetermined size, and
   c) transporting said oil from said filter system,
   d) the method further comprising the steps of detecting if any objects which will not pass through said filter system are within said oil prior to supplying said oil to said filter system and shutting down operation of a pre-treatment stage of said filter system if any such objects are detected.

2. The method of treating oil as set forth in claim 1, wherein said step of extracting said particulate materials includes separating said particulate materials from said oil and deoiling said separated particulate materials prior to removal from said filter system to reduce the amount of oil retained in said removed particulate materials.

3. The method of treating oil as set forth in claim 1, further comprising the step of removing from said particulate material above a predetermined size prior to transporting said oil from said filter system.

4. The method of treating oil as set forth in claim 1, further comprising the step of comminuting said particulate material above a predetermined size in said oil in said pre-treatment stage prior to supplying said oil to said filter system.

5. The method of treating oil as set forth in claim 4, further comprising the steps of:
   detecting if any clogging of the treatment stage occurs and shutting down operation of said treatment stage occurs if a predetermined amount of clogging is detected.

6. The method of treating oil as set forth in claim 1, further comprising the step of introducing a predetermined amount of a treatment material into said oil prior to supplying said oil to said filter system.

7. The method of treating oil as set forth in claim 6, wherein
   said treatment material introduced into said oil is selected from the group consisting of diatomaceous earth material, fuller's earth material and activated carbon material.

* * * * *